(12) United States Patent
Cazeaux

(10) Patent No.: US 11,499,504 B2
(45) Date of Patent: Nov. 15, 2022

(54) PROPULSION ASSEMBLY FOR AN AIRCRAFT, HAVING A MANEUVERABLE THRUST REVERSER

(71) Applicant: Airbus Operations (S.A.S.), Toulouse (FR)

(72) Inventor: Laurent Cazeaux, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 98 days.

(21) Appl. No.: 17/064,402

(22) Filed: Oct. 6, 2020

(65) Prior Publication Data

US 2021/0222648 A1 Jul. 22, 2021

(30) Foreign Application Priority Data

Oct. 8, 2019 (FR) .................................... 201911147

(51) Int. Cl.

| F02K 1/76 | (2006.01) |
|---|---|
| B64D 29/06 | (2006.01) |
| F02K 1/80 | (2006.01) |
| B64D 29/08 | (2006.01) |

(52) U.S. Cl.
CPC .............. *F02K 1/763* (2013.01); *B64D 29/06* (2013.01); *B64D 29/08* (2013.01); *F02K 1/80* (2013.01); *F05D 2220/323* (2013.01)

(58) Field of Classification Search
CPC ... F02K 1/763; F02K 1/80; F02K 1/82; F02K 1/72; B64D 29/06; B64D 29/08
See application file for complete search history.

(56) References Cited

U.S. PATENT DOCUMENTS

| 3,541,794 | A | * | 11/1970 | Bollenbacher | ............ | F02K 3/06 239/265.29 |
|---|---|---|---|---|---|---|
| 4,399,966 | A | | 8/1983 | Crudden et al. | | |
| 4,555,078 | A | * | 11/1985 | Grognard | ............... | B64D 29/06 60/797 |
| 4,585,189 | A | * | 4/1986 | Buxton | .................. | B64D 29/00 49/113 |

(Continued)

FOREIGN PATENT DOCUMENTS

| FR | 2 039 393 A1 | 1/1971 |
|---|---|---|
| FR | 3 007 739 A1 | 1/2015 |

OTHER PUBLICATIONS

French Search Report for Application No. 1911147 dated Jun. 9, 2020.

*Primary Examiner* — Andrew H Nguyen
(74) *Attorney, Agent, or Firm* — Jenkins, Wilson, Taylor & Hunt, PA

(57) ABSTRACT

A propulsion assembly for an aircraft includes a pylon, a turbofan including a structure fixed to the pylon, and at least one thrust reverser, each having a top beam extending parallel to a longitudinal direction and mobile in rotation on the structure around a rotation axis parallel to the longitudinal direction. For each thrust reverser, an actuator is provided, a first end of which is articulated on the pylon and a second end of which is articulated on the top beam of the thrust reverser and the articulation axis of the actuator on the top beam is not coaxial with the rotation axis. Such assembly allows a positioning of the actuator in the upper part of the turbofan between the top beam of the thrust reverser and the pylon to free some space.

7 Claims, 3 Drawing Sheets

(56) References Cited

U.S. PATENT DOCUMENTS

| | | | |
|---|---|---|---|
| 2010/0059634 A1* | 3/2010 | Vauchel | B64D 29/06 292/341.16 |
| 2010/0107599 A1* | 5/2010 | Vauchel | B64D 29/08 244/11 OB |
| 2016/0101871 A1 | 4/2016 | Boileau et al. | |

* cited by examiner

PROPULSION ASSEMBLY FOR AN AIRCRAFT, HAVING A MANEUVERABLE THRUST REVERSER

CROSS-REFERENCE TO RELATED APPLICATION

This application claims the benefit of and priority to French patent application number 201911147 filed on Oct. 8, 2019, the entire disclosure of which is incorporated by reference herein.

TECHNICAL FIELD

The disclosure herein relates to a propulsion assembly for an aircraft, the assembly having a thrust reverser that may be maneuvered between an open position and a closed position, and to an aircraft having at least one such propulsion assembly.

BACKGROUND

A prior art jet engine conventionally has a structure, a motor, a nacelle and a thrust reverser that are fastened to the structure. The jet engine also has a fan that is mounted so as to be able to move in rotation on the structure and is disposed inside a fan duct that splits into a primary duct that passes through the motor and a secondary duct that extends around the motor, between the motor and the nacelle.

The jet engine is fastened to a structure of the wing of the aircraft by a pylon that is fastened between the structure of the wing and the structure of the jet engine.

The thrust reverser is a set of elements that are generally arranged at the secondary duct and that have a reverser door that is able to move between a stowed position and a deployed position. In the stowed position, the reverser door does not obstruct the air that circulates in the secondary duct, and this air may therefore circulate freely from the front toward the rear. In the deployed position, the reverser door obstructs the air that circulates in the secondary duct, and this air is deviated toward the outside of the nacelle and more particularly toward the front of the nacelle, in order to assist with braking the aircraft.

There is generally one thrust reverser on each side of the pylon.

In order to allow maintenance to be performed on the jet engine, the thrust reverser is mounted so as to be articulated on hinges that are fastened to the structure of the jet engine. Thus, during maintenance, it is possible to lift the thrust reverser so as to open it and thus be able to access the space that is located underneath.

In order to assist with opening the reverser, it is known to put cylinders in place between a front frame of the reverser and the motor or the structure of the jet engine. Although such an arrangement makes opening the reverser easier, putting the cylinders in place level with the front frame of the reverser becomes very complex owing to the bulk at this location.

It is therefore necessary to find a different installation that makes it possible to free up space.

SUMMARY

An object of the disclosure herein is a propulsion assembly for an aircraft, wherein the assembly has a thrust reverser that may be maneuvered between an open position and a closed position, and wherein maneuvering is assisted by putting a cylinder in place level with an upper beam of the thrust reverser.

To that end, a propulsion assembly for an aircraft is proposed, the propulsion assembly having:
a pylon,
a jet engine that has a structure that is fastened to the pylon, at least one thrust reverser, each having an upper beam that extends parallel to a longitudinal direction and is mounted so as to be able to move in rotation on the structure about a rotation axis parallel to the longitudinal direction, and
for each thrust reverser, a cylinder of which a first end is mounted so as to be articulated on the pylon and of which a second end is mounted so as to be articulated on the upper beam of the thrust reverser, wherein the axis of the articulation of the cylinder on the upper beam is not coaxial with the rotation axis.

Such an assembly makes it possible to dispose the cylinder in the top part of the jet engine between the upper beam of the reverser and the pylon, thus freeing up space elsewhere.

Advantageously, the pylon is made up of a hollow box having, for each upper beam, a lateral wall facing the upper beam, for each upper beam, the lateral wall that is facing the upper beam has a hole through which the cylinder that is mounted so as to be articulated on the upper beam passes, and the first end that is mounted so as to be articulated on the pylon is fastened inside the hollow box.

According to a particular embodiment, the first end of each cylinder is mounted so as to be articulated on the lateral wall that the cylinder does not pass through.

According to a particular embodiment, the pylon has a central wall positioned midway between the lateral walls, and the first end of each cylinder is mounted so as to be articulated on the central wall.

Advantageously, the pylon has a window that allows access to each first end that is fastened inside the hollow box.

Advantageously, the propulsion assembly has a flap that is removably fastened to the pylon and closes the window.

The disclosure herein also proposes an aircraft having at least one propulsion assembly according to one of the preceding variants.

BRIEF DESCRIPTION OF THE DRAWINGS

The abovementioned features of the disclosure herein, along with others, will become more clearly apparent upon reading the following description of an exemplary embodiment, the description being given with reference to the appended drawings, in which.

DETAILED DESCRIPTION

Figure 1:
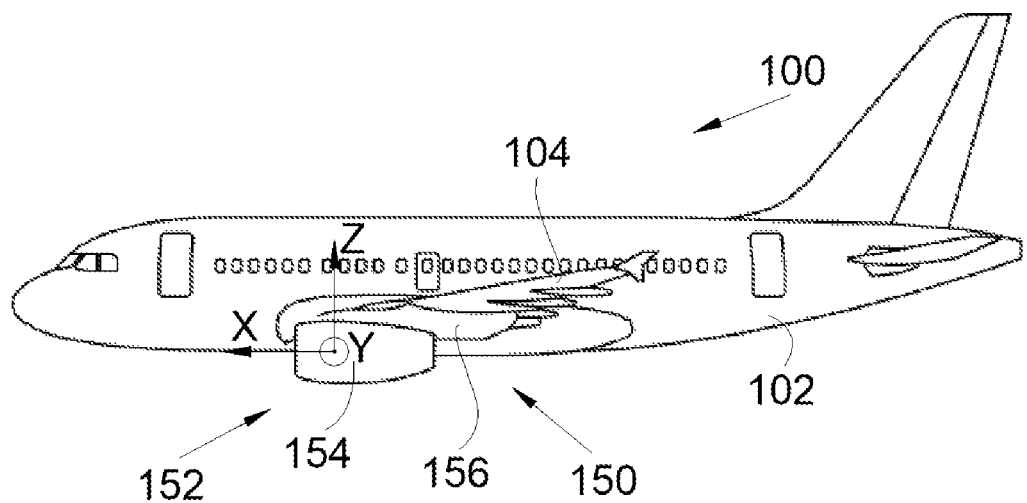
FIG. 1 is a side view of an aircraft having a propulsion assembly according to the disclosure herein.

FIG. 1 shows an aircraft 100 comprising a fuselage 102 on which two wings 104 (only one being visible in FIG. 1) are fastened, and each wing 104 bears at least one propulsion assembly 150 according to the disclosure herein.

The propulsion assembly 150 has a jet engine 152 that conventionally has a structure to which a motor and a nacelle 154 that is fastened around the motor are fastened. The propulsion assembly 150 has a pylon 156 that is fastened between the structure of the jet engine 152 and the structure of the wing 104. Thus, the pylon 156 is fastened to the structure of the jet engine 152 and to the structure of the wing 104.

The jet engine 152 has a secondary duct between the motor and the nacelle in which a stream of air circulates from the front toward the rear.

Throughout the following description, and by convention, the longitudinal direction X corresponds to the longitudinal direction of the jet engine 152, the transverse direction Y corresponds to the direction that is oriented transversely relative to the jet engine 152 and is horizontal when the aircraft 100 is on the ground, and the vertical direction Z corresponds to the vertical or height direction, these three directions X, Y and Z being mutually orthogonal.

Terms relating to a position are to be considered in relation to a position of use of the aircraft 100 that is encountered as a consequence of the thrust produced by the jet engines 152, i.e. such as are shown in FIG. 1 with a direction of advance oriented in the longitudinal direction X.

Figure 2:
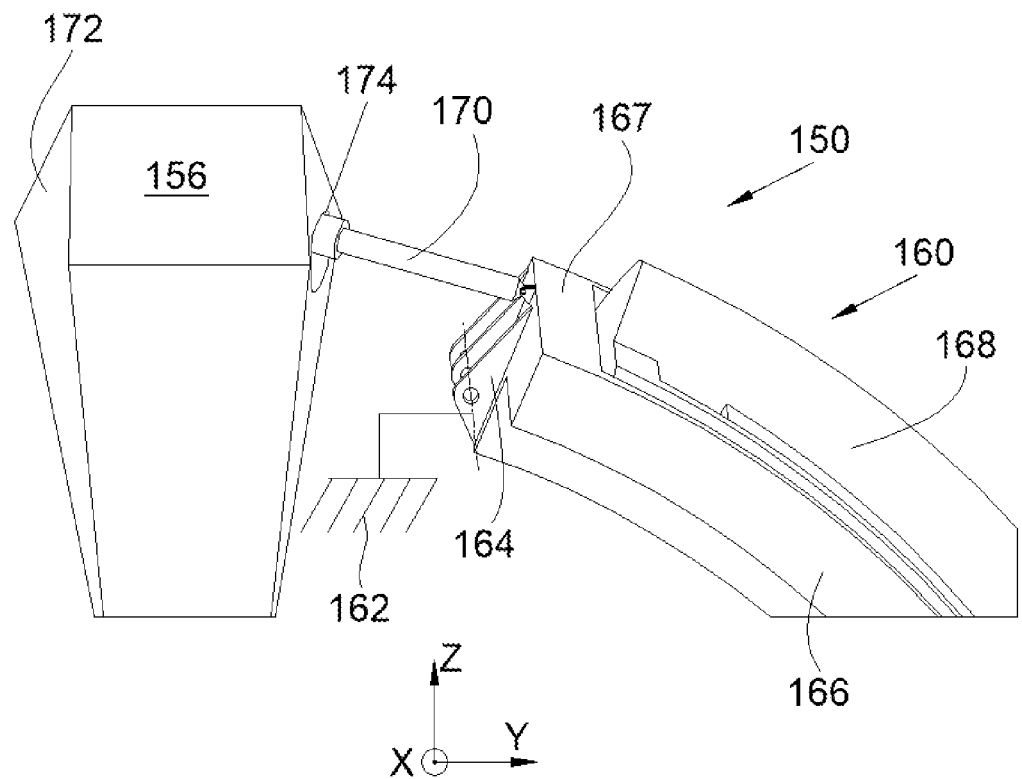
FIG. 2 is a perspective front view of a propulsion assembly according to the disclosure herein.

FIG. 2 shows a front view of the propulsion assembly 150 with the pylon 156 and a thrust reverser 160 of the jet engine 152.

The jet engine 152 has at least one thrust reverser 160 that is mounted so as to be able to move in rotation on the structure 162 of the jet engine 152 by a set of hinges 164 of which the rotation axis is generally parallel to the longitudinal direction X. In the embodiment of the disclosure herein that is presented in FIG. 2, there is a single reverser 160, on the port side relative to the pylon 156, but conventionally there is one either side of the pylon 156.

The thrust reverser 160 has a frame 166 inside which is mounted at least one reverser door 168 that is conventionally able to move between a stowed position and a deployed position. In the stowed position, the reverser door 168 does not obstruct the air circulating from the front toward the rear in the secondary duct, and in the deployed position, the reverser door 168 obstructs the air circulating in the secondary duct and deviates it toward the outside of the nacelle 154.

The frame 166 has an upper beam 167, referred to as the 12 o'clock beam, which bears the set of hinges 164 and extends generally parallel to the longitudinal direction X and is mounted so as to be able to move in rotation on the structure 162 about the rotation axis parallel to the longitudinal direction X.

For each reverser 160, the propulsion assembly 150 has a cylinder 170 of which a first end, in this case the body, is mounted so as to be articulated on the pylon 156 and of which a second end, in this case the rod, is mounted so as to be articulated on the upper beam 167 of the thrust reverser 160.

The axis of the articulation of the cylinder 170 on the upper beam 167 is not coaxial with the rotation axis of the set of hinges 164, in order to create a lever arm.

The cylinder 170 may be controlled in terms of lengthening and shortening by an appropriate control unit and the cylinder 170 may be of any type such as for example hydraulic or electric.

Such an installation makes it possible to separate the cylinder 170 from the front of the reverser 160 and thus to save space.

In the embodiment of the disclosure herein that is presented in FIG. 2, the articulation of the cylinder 170 on the upper beam 167 is above the axis of the set of hinges 164 and thus shortening the cylinder 170 tends to lift and open the reverser 160, and conversely lengthening the cylinder 170 tends to lower and close the reverser 160.

According to another embodiment that is not shown, the articulation of the cylinder 170 on the upper beam 167 may be below the axis of the set of hinges 164 and thus lengthening the cylinder 170 tends to lift and open the reverser 160, and conversely shortening the cylinder 170 tends to lower and close the reverser 160.

The pylon 156 is conventionally made up of a hollow box having lateral walls 172 that extend on the port side and on the starboard side of the pylon 156 and each lateral wall 172 is thus positioned facing an upper beam 167.

In order to obtain an additional space saving, for each upper beam 167, the lateral wall 172 that is facing the upper beam 167 has a hole 174 through which the cylinder 170 that is mounted so as to be articulated on the upper beam 167 passes, wherein the first end that is mounted so as to be articulated on the pylon 156 is fastened inside the hollow box.

Figure 3:
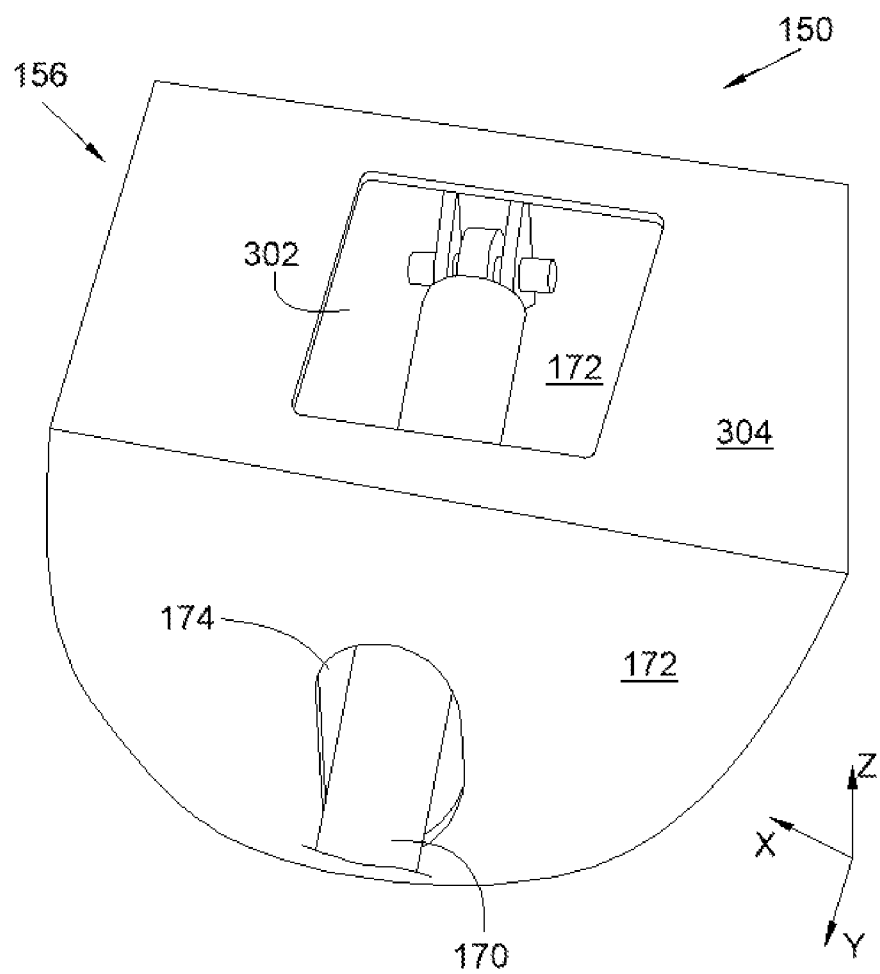
FIG. 3 is a perspective side view of a fastening system according to a first embodiment of the disclosure herein.

FIG. 3 shows a particular embodiment of the articulation of the cylinder 170 on the pylon 156. In this embodiment, the first end of each cylinder 170 is mounted so as to be articulated on the other lateral wall 172, i.e. the one the cylinder 170 does not pass through.

The fastening is realized in this case by a clevis connection.

In this embodiment, the two cylinders 170 that are disposed on the port side and on the starboard side are offset relative to one another so as not to come into contact with one another as they move.

Figure 4:
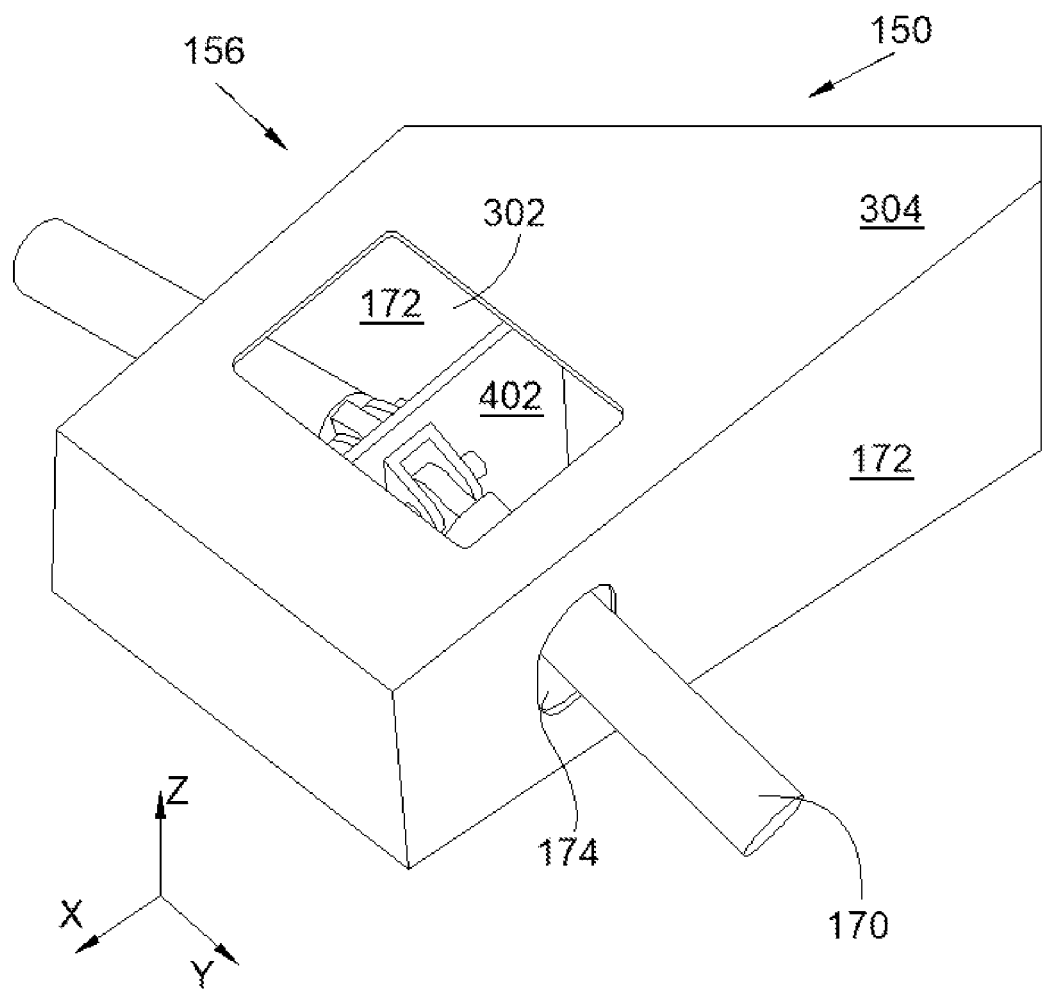
FIG. 4 is a perspective view of a fastening system according to a second embodiment of the disclosure herein.

FIG. 4 shows another particular embodiment of the articulation of the cylinder 170 on the pylon 156. In this embodiment, the pylon 156 has a central wall 402 that is positioned midway between the lateral walls 172 and is fastened inside the box. The central wall 402 is in this case in a median plane XZ of the pylon 156.

The first end of each cylinder 170 is mounted so as to be articulated on the central wall 402.

The fastening is realized in this case by a clevis connection.

In order to make the mounting/removal of the first end that is fastened inside the hollow box easier, the pylon 156 has a window 302 that passes through a wall of the pylon 156, in this case an upper wall 304, and allows access to each first end that is fastened inside the hollow box.

The window 302 may be closed by a flap that is removably fastened to the pylon 156.

While at least one example embodiment of the invention (s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion assembly for an aircraft, the propulsion assembly comprising:
   a pylon; and
   a jet engine that has a structure that is fastened to the pylon and at least two thrust reversers, wherein each of the at least two thrust reversers has an upper beam that extends parallel to a longitudinal direction and is mounted moveable in rotation on the structure about a rotation axis parallel to the longitudinal direction;
   wherein each of the at least two thrust reversers has a cylinder, of which a first end is mounted for articulation on the pylon and of which a second end is mounted for articulation on the upper beam of the respective thrust reverser, wherein an axis of articulation of the cylinder on the upper beam is not coaxial with the rotation axis; and
   wherein the pylon comprises a hollow box having, for each of the upper beams, a lateral wall facing the upper beam;
   wherein, for each of the upper beams, the lateral wall facing the upper beam has a hole through which the cylinder mounted for articulation on the upper beam passes;
   and wherein the first end mounted for articulation on the pylon is fastened inside the hollow box, the first end of each of the cylinders being mounted for articulation on the lateral wall that the cylinder does not pass through.

2. The propulsion assembly according to claim 1, wherein the pylon has a window that allows access to each of the first ends that is fastened inside the hollow box.

3. The propulsion assembly according to claim 2, comprising a flap that is removably fastened to the pylon and is configured to close the window.

4. An aircraft having at least one propulsion assembly according to claim 1.

5. The propulsion assembly according to claim 1, wherein the box comprises an upper wall that connects the lateral walls.

6. The propulsion assembly according to claim 5, wherein the upper wall has a window formed therein that allows access to each of the first ends that is fastened inside the hollow box.

7. The propulsion assembly according to claim 6, comprising a flap that is removably fastened to the pylon and is configured to close the window.

* * * * *